US011906068B2

(12) United States Patent
Arai et al.

(10) Patent No.: US 11,906,068 B2
(45) Date of Patent: *Feb. 20, 2024

(54) MOTOR-OPERATED VALVE

(71) Applicant: FUJIKOKI CORPORATION, Tokyo (JP)

(72) Inventors: Yusuke Arai, Tokyo (JP); Takeshi Hosoya, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 38 days.

This patent is subject to a terminal disclaimer.

(21) Appl. No.: 17/805,786

(22) Filed: Jun. 7, 2022

(65) Prior Publication Data

US 2022/0299125 A1  Sep. 22, 2022

Related U.S. Application Data

(63) Continuation of application No. 16/649,270, filed as application No. PCT/JP2018/035358 on Sep. 25, 2018, now Pat. No. 11,378,199.

(30) Foreign Application Priority Data

Sep. 28, 2017 (JP) .................................. 2017-187679

(51) Int. Cl.
  *F16K 31/04* (2006.01)
  *F16K 1/32* (2006.01)
  (Continued)

(52) U.S. Cl.
  CPC ................ *F16K 31/04* (2013.01); *F16K 1/32* (2013.01); *F16H 2025/2087* (2013.01);
  (Continued)

(58) Field of Classification Search
  CPC .................. F16C 17/08; F16C 2361/91; F16H 2001/2872; F16H 2025/2075;
  (Continued)

(56) References Cited

U.S. PATENT DOCUMENTS 3,737,000 A   6/1973  Knobloch et al.
7,325,780 B2  2/2008  Arai et al.
(Continued)

FOREIGN PATENT DOCUMENTS

CN  1821632 A   8/2006
EP  3109526 A1  12/2016
(Continued)

OTHER PUBLICATIONS

English translation of an Office Action for related Japanese application No. 2021-071765, dated Sep. 13, 2022.
(Continued)

*Primary Examiner* — Matthew W Jellett
(74) *Attorney, Agent, or Firm* — LUCAS & MERCANTI, LLP

(57) ABSTRACT

An electrically operated valve having excellent wear resistance while suppressing cost is provided. The electrically operated valve comprises a valve main body having a valve seat; a motor including a stator fixed to the valve main body and a rotor driven to rotate with respect to the stator, a planetary gear type deceleration mechanism configured to decelerate rotation of the rotor to transmit to an output gear, a valve member configured to be movable toward and away from the valve seat in an axial direction, and a feed screw mechanism configured to convert rotational movement of the output gear into movement of the valve member in the axial direction. The planetary gear type deceleration mechanism includes a sun gear coupled to the rotor, a planetary gear engaged with the sun gear, a carrier for rotatably
(Continued)

supporting the planetary gear, an annular ring gear engaged with the planetary gear, and a sliding member abutting against an axial end of the sun gear. The output gear has a different number of teeth than the ring gear, and engages with the planetary gear, and the sliding member is made of a different material from the material of the sun gear.

9 Claims, 5 Drawing Sheets

(51) Int. Cl.
*F16H 25/20* (2006.01)
*F16K 31/50* (2006.01)
*F16K 31/53* (2006.01)
*F25B 41/35* (2021.01)

(52) U.S. Cl.
CPC .............. *F16K 31/50* (2013.01); *F16K 31/53* (2013.01); *F25B 41/35* (2021.01)

(58) Field of Classification Search
CPC .... F16H 2025/2087; F16K 1/32; F16K 31/04; F16K 31/50; F16K 31/53; F25B 41/35; H02K 7/06; H02K 7/116; Y02B 30/70
See application file for complete search history.

(56) References Cited

U.S. PATENT DOCUMENTS

| | | |
|---|---|---|
| 7,523,917 B2 | 4/2009 | Arai |
| 7,758,013 B2 | 7/2010 | Arai et al. |
| 8,794,591 B2 | 8/2014 | Arai |
| 8,851,448 B2 | 10/2014 | Harada et al. |
| 9,726,406 B2 | 8/2017 | Sekiguchi |
| 2006/0180780 A1 | 8/2006 | Arai et al. |
| 2012/0068098 A1 | 3/2012 | Arai |
| 2016/0290525 A1 | 10/2016 | Hotta et al. |
| 2018/0147712 A1 | 5/2018 | Hita |

FOREIGN PATENT DOCUMENTS

| | | | | |
|---|---|---|---|---|
| JP | 2005048779 A | * | 2/2005 | ............ F16K 31/04 |
| JP | 2005-214393 A | | 8/2005 | |
| JP | 4817671 B | | 8/2006 | |
| JP | 2008-247055 A | | 10/2008 | |
| JP | 2009-228889 A | | 10/2009 | |
| JP | 2010-091095 A | | 4/2010 | |
| JP | 2017-150669 A | | 8/2017 | |
| WO | 2003/023265 A1 | | 3/2003 | |
| WO | 2017/038846 A1 | | 3/2017 | |

OTHER PUBLICATIONS

Extended European Search Report dated Jan. 2, 2023, for European Patent Application No. 22210461.4.
PCT, International Search Report for the corresponding application No. PCT/JP2018/035358, dated Dec. 18, 2018 (4 pages).
PCT, Written Opinion of the International Searching Authority for the corresponding application No. PCT/JP2018/033999, dated Dec. 18, 2018 (in Japanese language only).
Informal Comments in response to Written Opinion for the corresponding application No. PCT/JP2018/035358, with English translation (4 pages).
JPO, Office Action for related Japanese application No. 2017-187679, dated Oct. 27, 2020, with English translation obtained from the Global Dossier.
KIPO, Office Action for related Korean application No. 10-2020-7006495, dated Nov. 24, 2020, with English translation obtained from the Global Dossier.
EPO, Extended European Search Report for related European application No. 18862473.8, dated May 19, 2021.
KIPO, Office Action for related Korean application No. 10-2021-7011999, dated Apr. 26, 2021, with machine English translation.
CNIPA, Office Action for related Chinese application No. 201880063044.5, dated Jun. 29, 2021, with machine English translation.
Office Action for related Japanese application No. 2021-071765, dated Sep. 13, 2022, a translation thereof being submitted on Nov. 2, 2022.

* cited by examiner

MOTOR-OPERATED VALVE

This Application is continuation of U.S. patent application Ser. No. 16/649,270 filed Mar. 20, 2020, which is a 371 of PCT/JP2018/035358 filed on Sep. 25, 2018 which, in turn, claimed the priority of Japanese Patent Application No. 2017-187679 filed on Sep. 28, 2017, the above applications are incorporated herein by reference.

TECHNICAL FIELD

The present invention relates to an electrically operated valve, and, for example, to an electrically operated valve incorporated in a refrigeration cycle and used for controlling the flow rate of a fluid such as a refrigerant.

BACKGROUND OF THE INVENTION

Conventionally, as a so-called electrically operated valve for opening and closing valves using an electric motor, there is known a valve which is opened and closed by directly transmitting the rotation of a rotor to a screw mechanism. There is demand for such electrically operated valves to open and close valves under higher load conditions, or to further improve the angular resolution of the valve opening degree.

With respect to this, as illustrated in Patent Document 1, the present applicant has proposed an electrically operated valve in which the rotation of the rotor is decelerated by a planetary gear type deceleration mechanism and transmitted to a screw mechanism. Since the torque per unit rotation of the rotor becomes large in such an electrically operated valve, it can be used even under high load conditions, and the angular resolution of the valve opening degree per single drive pulse can be increased.

CITATION LIST

Patent Literature

Patent Document 1: Japanese Patent No. 4,817,671

SUMMARY OF INVENTION

Technical Problem

Incidentally, in planetary gear type deceleration mechanisms in which the lower surface of a sun gear member formed integrally with the upper end of a sun gear faces an upper surface of a ring gear, due to this structural configuration, sliding occurs when both come into contact. On the other hand, from the viewpoint of cost reduction, it is generally preferable to form the sun gear and the ring gear from a resin material. However, if the lower surface of the sun gear member and the upper surface of the ring gear formed of the same resin material are slid together, the relative speed between the sliding surfaces of these members is high, and therefore there is a risk of causing premature wear. Therefore, in Patent Document 1, a leaf spring is installed to urge the sun gear member in one direction to separate the sun gear member from the ring gear. However, from the viewpoint of cost reduction, there has been a demand for removing this leaf spring.

It is an object of the present invention to provide an electrically operated valve that has excellent wear resistance while also suppressing the cost.

Solution to Problem

In order to achieve the above object, the electrically operated valve according to the present invention includes a valve main body having a valve seat, a motor including a stator fixed to the valve main body and a rotor driven to rotate with respect to the stator, a planetary gear type deceleration mechanism configured to decelerate rotation of the rotor to transmit to an output gear, a valve member configured to be movable toward and away from the valve seat in an axial direction, and a feed screw mechanism configured to convert rotational movement of the output gear into movement of the valve member in the axial direction, wherein the planetary gear type deceleration mechanism includes a sun gear coupled to the rotor, a planetary gear engaged with the sun gear, a carrier for rotatably supporting the planetary gear, an annular ring gear engaged with the planetary gear, and a sliding member abutting against an axial end of the sun gear, the output gear has a different number of teeth than the ring gear, and engages with the planetary gear, and the sliding member is made of a different material from the material of the sun gear.

The sliding member is preferably an annular body disposed between the sun gear and the carrier and is configured to slide with respect to at least one of them.

The sliding member is preferably an output shaft configured to slide with respect to the axial end of the sun gear, and is connected to the output gear to transmit a rotational force to the feed screw mechanism.

It is preferable that the sun gear is made of a resin material, and the sliding member is made of a metal, ceramic, or glass material.

Advantageous Effects of Invention

According to the present invention, it is possible to provide an electrically operated valve that has excellent wear resistance while suppressing the cost.

DESCRIPTION OF EMBODIMENT(S)

Figure 1:
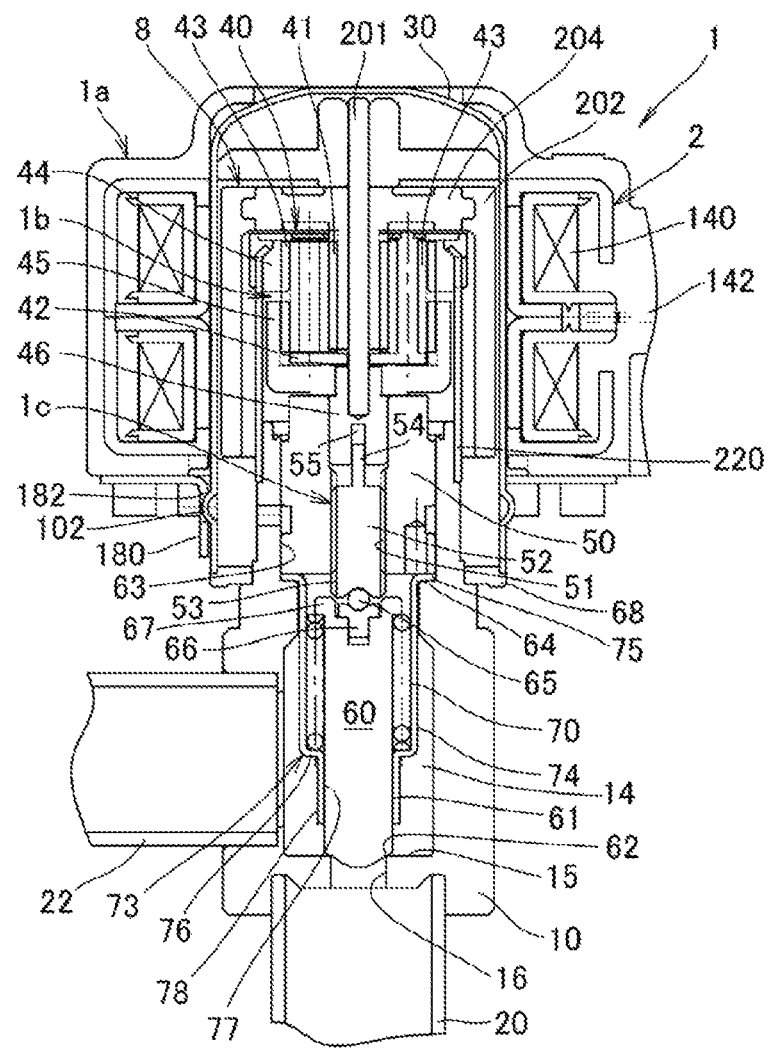
FIG. 1 is an overall longitudinal cross-sectional view illustrating an electrically operated valve according to the present embodiment.

Hereinafter, an electrically operated valve according to an embodiment of the present invention will be described with reference to the drawings. It should be noted that in the following description of the embodiments and comparative examples, parts and members having the same functions are denoted by the same reference numerals, and redundant description of parts and members denoted by the same reference numerals is omitted.

(Definition of Different Materials and Axial Direction)

Here, when "adhesion wear" occurs when two members are slid together, the material on which those members are formed is referred to as the same type of material. Further, a "different material" refers to materials which are not the same material; that is, when "adhesion wear" does not occur when two members are slid together, the material of one member corresponds to a different material with respect to the material of the other member. Examples of different types of materials include materials of different categories when arbitrary materials are classified into categories such as, for example, metals, resins, ceramics, glass, and the like. In addition, the "axial direction" herein refers to the axial direction of the valve main body.

Embodiment 1

Figure 2:
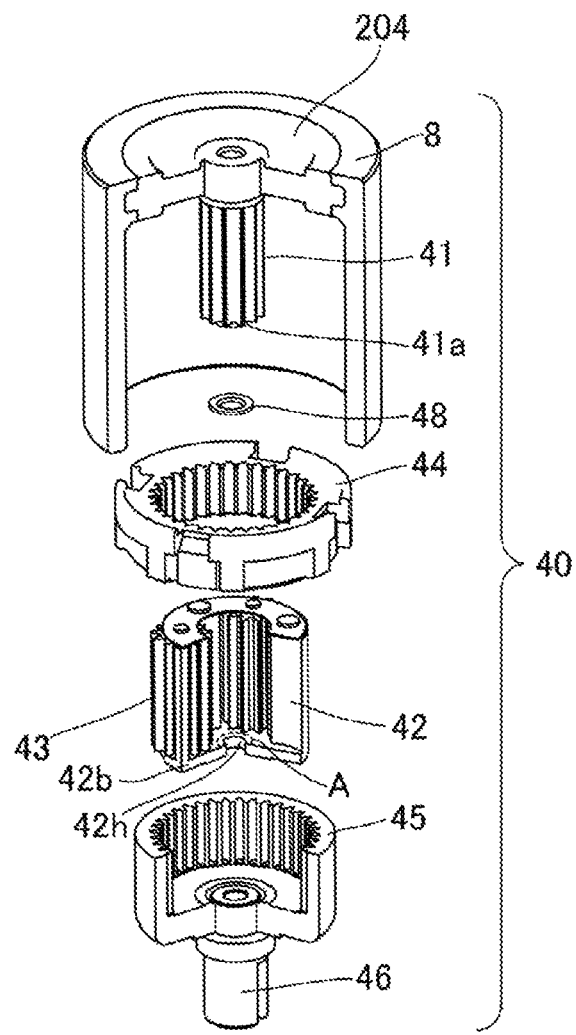
FIG. 2 is an exploded perspective view of a planetary gear type deceleration mechanism used in the electrically operated valve illustrated in FIG. 1.
Figure 3:
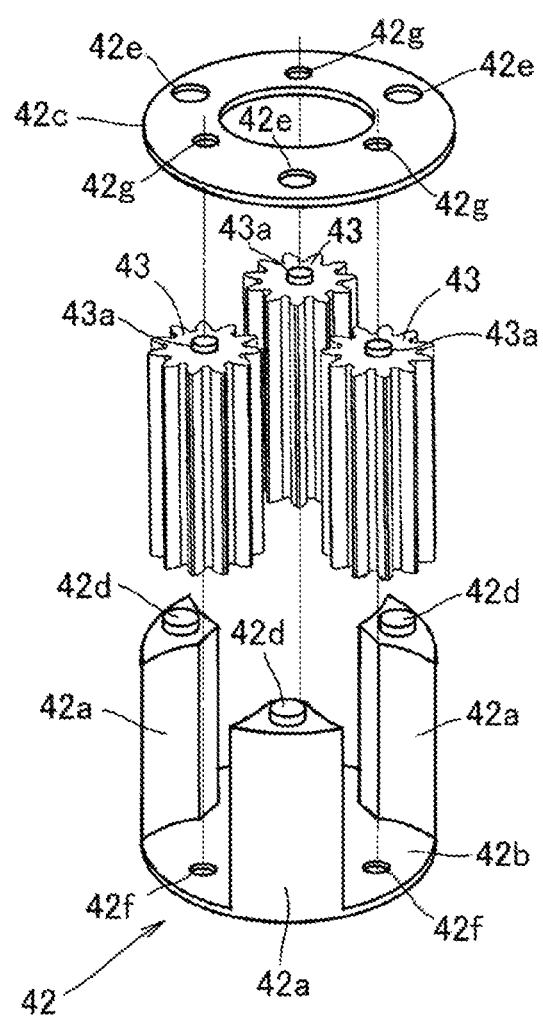
FIG. 3 is an exploded perspective view of the planetary gear and carrier of the planetary gear type deceleration mechanism illustrated in FIG. 2.

FIG. 1 is an overall longitudinal cross-sectional view illustrating an electrically operated valve according to the present embodiment. FIG. 2 is an exploded perspective view of a planetary gear type deceleration mechanism used in the electrically operated valve illustrated in FIG. 1, but a part thereof is cut away to facilitate better understanding. FIG. 3 is an exploded perspective view of the planetary gear and the carrier of the planetary gear type deceleration mechanism illustrated in FIG. 2.

The electrically operated valve 1 includes a drive unit 1a that is operated by an exciting action and which includes a motor composed of a stator 2 and a rotor assembly (hereinafter also called a motor) 8, a gear deceleration unit 1b which receives a rotational driving force from the drive unit 1a and performs gear deceleration to output a decelerated rotational force, and a feed screw mechanism 1c which converts the rotation decelerated by the gear deceleration unit 1b into a displacement in the axial direction using a screw action and outputs the displacement in the axial direction.

The can 30 is an air-tight container fixed to the valve main body 10 via a bearing member 68, and has a thin-walled cylindrical shape with a top. The drive unit 1a includes a stator 2 and a permanent-magnet type rotor assembly 8 which is rotationally driven by the stator 2. The stator 2 is an exciting device for an electric motor, and is fixedly disposed on the outer peripheral portion of the can 30 and is formed by molding a coil 140 wound around a bobbin integrally with resin. The rotor assembly 8 is rotatably supported inside the can 30. The stator 2 and the rotor assembly 8 constitute a stepping motor as one example of an electric motor.

The stator 2 is detachably fitted to the can 30 by a mounting bracket 180 formed of a leaf spring. In this example, the dome portion 102 formed in the can 30 is elastically fitted into a hole 182 formed in the mounting bracket 180, thereby positioning the stator 2 relative to the can 30. Coils 140 are supplied by an external power source via a lead 142 for excitation of the stator 2.

The valve main body 10 includes a valve chamber 14 formed therein, and also a bottom portion 15 formed with an orifice 16 that opens to the bottom surface of the valve main body 10. A pipe 22 that communicates with the side surface of the valve chamber 14 and a pipe 20 that communicates with the lower end of the orifice 16 are fixed to the valve main body 10.

The gear deceleration unit 1b is composed of a planetary gear type deceleration mechanism (hereinafter abbreviated as a "deceleration mechanism") 40 for decelerating the rotational speed of the rotor assembly 8.

As illustrated in FIG. 2, the deceleration mechanism 40 includes a sun gear 41 integrated with the rotor assembly 8, a plurality (three in this example) of planetary gears 43 engaged with the sun gear 41 that are elongated in the axial direction and rotatably supported by a carrier 42 formed by molding plastic, for example; a ring gear 44 that is arranged concentrically with the sun gear, fixedly supported with respect to the valve main body 10, and engaged with a part (the upper portion) of each planetary gear 43; and an output gear 45 formed in a cylindrical shape with a bottom that has a number of inner teeth slightly different from the number of teeth of the ring gear 44 (that is, in a profile-shifted relationship with the ring gear 44). The sun gear 41, the carrier 42, the ring gear 44, and the output gear 45 are formed of polyphenylene sulfide resin (PPS).

In FIG. 3, the carrier 42 includes a lower disk 42b formed by implanting three column portions 42a in parallel on the outer periphery of the upper surface, and an annular plate 42c. A cylindrical protrusion 42d is formed on the upper end of each of the column portion 42a, and three corresponding through holes 42e are formed in the plate 42c.

On the other hand, the planetary gear 43 formed of a zinc alloy has cylindrical convex portions 43a (only the upper end side is shown) at both ends in the axial direction. In opposition to this, an axial hole 42f is formed in the lower disk 42b, and an axial hole 42g is formed in the plate 42c.

The carrier 42 and the planetary gear 43 are assembled in the following manner. First, the planetary gear 43 is assembled to the lower disk 42b while the convex portion 43a is fitted to the axial hole 42f, and then the plate 42c is assembled such that the convex portion 43a is further fitted to the axial hole 42g, and the through hole 42e is engaged to the protrusion 42d of the column portion 42a. Thereafter, the plate 42c can be fixed to the column portion 42a by welding the protrusion 42d using, for example, an ultrasonic welding means. Since the axial holes 42f and 42g and the convex portion 43a are rotatable relative to each other, the planetary gear 43 is freely rotatable with respect to the carrier 42. It should be noted that the method of assembling the carrier 42 is not limited to the above.

As can be seen in FIG. 2, each planetary gear 43 engages with the ring gear 44, and at the same time engages with the inner teeth of the output gear 45 at one part (the lower portion). In FIG. 1, the rotational force of the rotor assembly 8 decelerated by the deceleration mechanism 40 is transmitted to the output shaft 46 (the driver) of the feed screw mechanism 1c through the output gear 45. An upper end of the output shaft 46, which is made of stainless steel, is coaxially fixed to the output gear 45.

In the rotor assembly 8, a cylindrical body 202 serving as a peripheral wall and a sun gear member 204 disposed at the center are integrally molded into a cylindrical shape with a top by a plastic material (here, PPS) that contains a magnetic material, and the rotor assembly 8 is rotatably disposed inside the can 30 by a shaft 201 that passes through the sun gear member 204 in the axial direction. As illustrated in FIG. 2, the sun gear 41 is formed on the outer periphery of a cylinder implanted in the center of the sun gear member 204. The ring gear 44 is, for example, a ring-shaped gear formed by molding plastic, and is fixed to an upper portion of a gear case 220, which is a cylindrical member whose lower portion is fitted to an upper portion of the valve main body 10, as illustrated in FIG. 1.

According to such a configuration, when the sun gear 41 to which the output rotation of the electric motor is input rotates around itself, the planetary gear 43 engaged with the sun gear 41 and the ring gear 44 revolves around the sun gear 41 while rotating. Since the planetary gear 43 engages with the output gear 45 which is profile-shifted in relation to the ring gear 44, this rotation of the planetary gear 43 causes the output gear 45 to rotate at a very high deceleration rate relative to the ring gear 44, for example, on the order of 50 to 1, depending on the degree of profile-shift (the difference in the number of teeth). A planetary gear mechanism in which a planetary gear 43 engages with a ring gear 44 and an output gear 45 in a profile-shifted relationship is referred to as a mechanical paradox planetary gear mechanism.

According to the present embodiment, there is provided a sliding member which abuts against the axial direction end of the sun gear 41, and this sliding member is formed of a different material than the sun gear 41. Therefore, since wear (primarily adhesion wear) does not occur from sliding with the sun gear 41, it is possible to suppress the wear of the sun gear 41 without urging the sun gear 41 away from the carrier 42 using a spring member or the like. Hereinafter, the sliding member will be specifically described.

Figure 4:
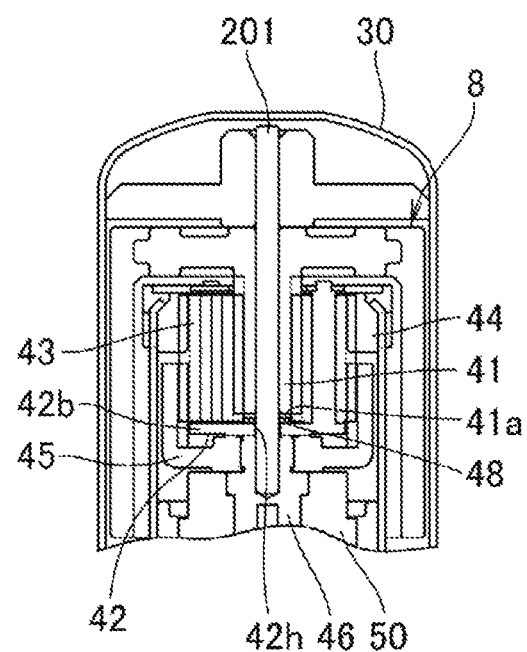
FIG. 4 is an enlarged view illustrating the inside of a can 30 in the configuration of FIG. 1.

FIG. 4 is an enlarged view illustrating the inside of the can 30 in the configuration of FIG. 1. As illustrated in FIG. 4, the lower disk 42b of the carrier 42 has a circular opening 42h at the center thereof which passes through the shaft 201. In addition, the sun gear 41 through which the shaft 201 penetrates in the axial direction has an annular boss 41a at the tip (lower end), as partially illustrated in FIG. 2.

Further, a thin annular body 48 (illustrated by the hatching in FIG. 4) made of stainless steel is disposed between the annular boss 41a and the lower disk 42b. The annular body 48 that serves as the sliding member may be a washer that has the same diameter as the boss 41a.

Referring to FIG. 1, the feed screw mechanism 1c includes a cylindrical bearing 50, a screw shaft 52, and a ball 65. The lower end of the cylindrical bearing 50 is fitted into the valve main body 10, and is attached to the stepped portion 64 of the valve main body 10 in a state of being supported via the upper flange portion 75 so as not to be able to be pulled out from the valve main body 10 by means of press working or the like.

The cylindrical bearing 50 supports the output gear 45 of the deceleration mechanism 40 from the lower side at its upper end surface, and the output shaft 46 of the deceleration mechanism 40 is inserted into the hollow upper portion of the cylindrical bearing 50. A male screw portion 53 formed on the outer periphery of the screw shaft 52 is screwed to the female screw portion 51 formed in the hollow lower portion of the cylindrical bearing 50. In addition, a convex portion 54, which is a flat driver portion, is provided on the screw shaft 52 and is inserted into a slit-shaped concave portion 55 formed in the lower end portion of the output shaft 46 of the deceleration mechanism 40, and transmits the rotation of the output shaft 46 to the screw shaft 52. A concave portion is formed in the lower end of the screw shaft 52, and the ball 65 is fixed to the screw shaft 52 in a state in which it is fitted into the concave portion.

The rotation of the screw shaft 52 is converted into movement in the axial direction by the screw action with the cylindrical bearing 50, and transmitted to the valve shaft 60 side via the ball 65 and the ball bearing member 66. It should be noted that the screw shaft 52 may be provided with a concave portion, and the output shaft 46 may be provided with a convex portion inserted into the concave portion.

When the screw shaft 52 is moved in the valve opening direction in the feed screw mechanism 1c, in order to remove backlash between the female screw portion 51 and the male screw portion 53, the valve main body 10 is provided with a coil spring 70 for urging the valve shaft 60 in the valve opening direction. In order to support the coil spring 70, a bottomed cylindrical spring support 73 made of metal is disposed in the valve chamber 14. The spring support 73 includes a cylindrical peripheral wall 74 which opens and covers a circular space between the upper outer periphery of the valve shaft 60 and itself, an upper flange portion 75 extending radially outward from the upper end, a lower flange portion 76 extending radially from the lower end of the peripheral wall 74 to the outer periphery of the valve shaft 60, and a cylindrical guide portion 78 extending coaxially with the valve shaft 60 from the lower flange portion 76. The inner circumference of the guide portion 78 slides with respect to the outer circumferential surface of the valve shaft 60, and forms a hole 77 for guiding the valve shaft 60.

The coil spring 70 disposed in the space between the valve shaft 60 and the peripheral wall 74 is supported in a compressed state as a result of its upper end abutting against the large diameter portion 67 of the valve shaft 60 and its lower end abutting against the lower flange portion 76 of the spring support 73. The upper flange portion 75 of the peripheral wall 74 is fixed by being interposed between the stepped portion 64 formed at the lower end of the valve hole 63 of the valve main body 10 and the lower end of the cylindrical bearing 50 mounted in the valve hole 63.

The valve shaft 60 is constantly urged in the valve opening direction (the direction of the feed screw mechanism 1c) by the spring force of the coil spring 70 held in the compressed state in the spring support 73, and when the valve shaft 60 is pushed down in the valve closing direction by the force from the feed screw mechanism 1c, the valve shaft 60 is lowered against the spring force of the coil spring 70, and the valve member 61 formed at the distal end of the valve shaft 60 is seated on the valve seat 62 to close the orifice 16.

The screw shaft 52 can be rotated a small number of revolutions with respect to the rotation of the rotor assembly 8, and the axial displacement of the screw shaft 52 corresponding to this rotation can be controlled down to a small amount of displacement, so that the position of the valve shaft 60 with respect to the valve seat 62 is positioned with a high resolution by the gear deceleration unit 1b, the flow path area between the valve member 61 and the orifice 16 is controlled with a high accuracy, and the flow rate of the refrigerant passing therethrough can be adjusted with a high accuracy. In other words, valve opening control with high angular resolution is achieved. When operating the feed screw mechanism 1c in the valve opening direction, the valve shaft 60 moves in accordance with the rise of the screw shaft 52 as a result of the spring force of the coil spring 70,.

In the electrically operated valve illustrated in FIG. 1, refrigerant is introduced into the can 30 through a minute gap between the inside of the guide portion 78 of the spring support 73 (the hole 77) and the valve shaft 60, and a gap appropriately provided in the valve main body 10, the cylindrical bearing 50, and the like. The minute gap between the guide portion 78 of the spring support 73 and the valve shaft 60 has an effect of preventing foreign matter which may be contained in the refrigerant from entering the can 30.

In the electrically operated valve 1 of the present embodiment, the output gear 45 and the output shaft 46 move as one unit in the rotational and axial directions. Since such a structure is provided, it is unnecessary to provide a complicated coupling structure between the output gear and the output shaft, and a simple electrically operated valve 1 can be provided.

The operation of the electrically operated valve 1 according to the present embodiment will be described. When electric power is supplied from an external power source through the leads 14 in response to a valve opening signal, the stator 2 generates a magnetic force. The rotor assembly 8 is rotationally driven based on this magnetic force, and generates a rotational force in a predetermined direction. This rotational force is transmitted to the sun gear 41, decelerated via the deceleration mechanism 40, and transmitted to the output gear 45. Further, since the rotational movement of the output gear 45 is converted into the upward movement of the screw shaft 52 through the feed screw mechanism 1c, the valve shaft 60 urged by the spring force of the coil spring 70 follows the upward movement of the screw shaft 52, and the valve member 61 separates from the valve seat 62 to allow the passage of the refrigerant. On the other hand, when electric power of the inverse characteristic is supplied from an external power source via the lead 142 in response to a valve closing signal, the valve shaft 60 descends against the spring force of the coil spring 70 by a operation opposite to that described above, and the valve member 61 is seated on the valve seat 62 to prevent passage of the refrigerant.

In the present embodiment, since the carrier 42 is mounted on the bottom surface of the output gear 45, the carrier 42 and the planetary gear 43 are also raised and lowered in accordance with the raising and lowering of the output gear 45.

In such a case, supposing that neither the prior art spring member nor the annular body 48 were provided, the lower surface of the sun gear member 204 provided on the rotor assembly 8 would come into contact with the upper surface of the ring gear 44 and these surfaces would slide relative to one another during the operation of the deceleration mechanism.

Accordingly, in order to prevent such a problem, in this embodiment, an annular body 48 made of stainless steel, which can be manufactured relatively inexpensively, is disposed between the boss 41a and the lower disk 42b as a sliding member. As a result, relative sliding occurs results between the boss 41a and the annular body 48, or between the annular body 48 and the lower disc 42b, but since the boss 41a, the lower disc 42b, and the annular body 48 are different materials from each other, wear does not occur even under severe conditions, and it is possible to avoid premature wear of the boss 41a.

Embodiment 2

Figure 5:
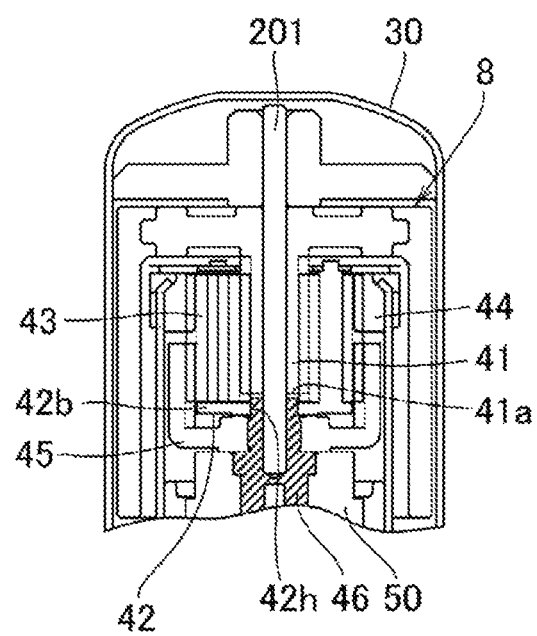
FIG. 5 is a cross-sectional view similar to FIG. 4 of an electrically operated valve according to another embodiment.

FIG. 5 is a cross-sectional view of the inside of a can of an electrically operated valve according to another embodiment. In this embodiment, no annular body is used, and instead, the output shaft 46 (illustrated by the hatching in FIG. 5) also serves as the sliding member that slides to the boss 41a of the sun gear 41. That is, the upper end portion of the output shaft 46 functions as the sliding member.

More specifically, the circular opening 42h provided at the center of the lower disk 42b of the carrier 42 is made larger in diameter, and the upper end of the output shaft 46 is extended upward to be fitted into the circular opening 42h. At this time, the upper end surface of the output shaft 46 that is exposed from the lower disk 42b comes into contact with the lower surface of the boss 41a of the sun gear 41, and these two surfaces slide with each other during the operation of the electrically operated valve 1. Since the boss 41a is made of PPS while the output shaft 46 is made of stainless steel, the two are made of different materials, such that wear does not occur during sliding, and premature wear of the boss 41a can be avoided. According to the present embodiment, in addition to omitting the spring member of the related art, the wear of the boss 41a can be suppressed without adding parts, and as a result, the assembly process can be simplified. The rest of the configuration is the same as that of the above-described embodiments.

It should be noted that, the present invention is not limited to the above embodiments. Within the scope of the present invention, any of the components of the above embodiments can be modified. In addition, any component can be added or omitted in the above-described embodiments.

For example, although the annular body is made of stainless steel in the above-described embodiments, it may be made of other metals, or may be made of ceramic or glass.

REFERENCE SIGNS LIST

1 Electrically operated valve
1a Drive unit
1b Gear deceleration unit
1c Feed screw mechanism
2 Stator
8 Rotor assembly
10 Valve main body
14 Valve chamber
16 Orifice
20,22 Pipe
30 Can
40 Planetary gear type deceleration mechanism
41 Sun gear
42 Carrier
43 Planetary gear
44 Ring gear
45 Output gear
46 Output shaft
48 Annular body
50 Cylindrical bearing
51 Female screw portion
52 Screw shaft
53 Male screw portion
54 Convex portion
55 Concave portion
60 Valve shaft
61 Valve member
62 Valve seat
63 Valve hole
64 Stepped portion
65 Ball
66 Ball bearing member
67 Large diameter portion
68 Bearing member
70 Coil spring
73 Spring support
74 Peripheral wall
75 Upper flange portion
76 Lower flange portion
77 Hole
78 Guide portion
102 Dome portion
140 Coil
142 Lead
180 Mounting bracket
182 Hole
201 Shaft
202 Cylindrical body
220 Gear case

The invention claimed is:

1. An electrically operated valve comprising:
a valve main body having a valve seat;
a motor including:
a stator fixed to the valve main body, and
a rotor driven to rotate with respect to the stator,
a planetary gear type deceleration mechanism configured to decelerate rotation of the rotor to transmit to an output gear;
a valve member configured to be movable toward and away from the valve seat in an axial direction; and
a feed screw mechanism configured to convert rotational movement of the output gear into movement of the valve member in the axial direction;
wherein:
the planetary gear type deceleration mechanism includes:
a sun gear coupled to the rotor,
a planetary gear engaged with the sun gear,
a carrier for rotatably supporting the planetary gear,
an annular ring gear engaged with the planetary gear, and
a sliding member abutting against an axial end of the sun gear,
the output gear has a different number of teeth than the ring gear, and engages with the planetary gear, and
the sliding member is made of a different material from the material of the sun gear, the sliding member is:
a washer-shaped annular body disposed between the sun gear and the carrier and is freely slidingly rotatable with respect to both the axial end of the sun gear and the carrier, or
an output shaft that is connected to the output gear and slidingly rotates against the axial end of the sun gear.

2. The electrically operated valve according to claim 1, wherein:
the sliding member is the washer-shaped annular body disposed between the sun gear and the carrier and is freely slidingly rotatable with respect to both the axial end of the sun gear and the carrier.

3. The electrically operated valve according to claim 2, wherein:
the sun gear includes an annular boss disposed at an axial end thereof and the washer-shaped annular body abuts against the annular boss, a diameter of the washer-shaped annular body being the same as a diameter of the annular boss.

4. The electrically operated valve according to claim 2, wherein:
the washer-shaped annular body is a stainless steel washer and the annular boss is a resin material.

5. The electrically operated valve according to claim 1, wherein:
the sliding member is the output shaft and slidingly rotates against the axial end of the sun gear, and the sliding member is connected to the output gear to transmit a rotational force to the feed screw mechanism.

6. The electrically operated valve according to claim 5, wherein:
the carrier includes a lower disk that supports one end of the planetary gear, and the output shaft extends through a circular opening in the lower disk.

7. The electrically operated valve according to claim 5, wherein:
the output shaft is made of stainless steel and the sun gear is made of a resin material.

8. The electrically operated valve according to claim 5, further comprising:
a plurality of planetary gears, each engaged with the sun gear, the annular ring gear, and the output gear,
wherein the carrier includes a lower disk, columnar portions disposed in parallel on an outer periphery of an upper surface of the lower disk circumferentially between pairs of the plurality of planetary gears, and an annular plate arranged on top of the columnar portions; and
ends of the planetary gears are respectively held in the lower disk and the annular plate.

9. The electrically operated valve according to claim 5, wherein:
the sun gear is made of a resin material, and the sliding member is made of a metal, ceramic, or glass material.

* * * * *